United States Patent
Lee et al.

(10) Patent No.: US 8,477,866 B2
(45) Date of Patent: Jul. 2, 2013

(54) CALIBRATION METHOD FOR TX/RX PATH CHARACTERISTIC OF CHANNEL SOUNDER

(75) Inventors: Sung-Jun Lee, Daejeon (KR); Kwang-Chun Lee, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 381 days.

(21) Appl. No.: 12/973,231

(22) Filed: Dec. 20, 2010

(65) Prior Publication Data

US 2011/0150139 A1 Jun. 23, 2011

(30) Foreign Application Priority Data

Dec. 21, 2009 (KR) .................. 10-2009-0128524

(51) Int. Cl.
*H04L 1/02* (2006.01)
*H04B 7/02* (2006.01)

(52) U.S. Cl.
USPC ........... 375/267; 375/142; 375/146; 375/147; 375/295; 375/299; 375/316; 375/347; 370/334; 455/101

(58) Field of Classification Search
USPC ................. 375/267, 142, 146, 147, 295, 299, 375/316, 347; 370/334; 455/101
See application file for complete search history.

(56) References Cited

U.S. PATENT DOCUMENTS

| | | | | |
|---|---|---|---|---|
| 6,654,432 | B1 * | 11/2003 | O'Shea et al. | 375/354 |
| 2003/0231714 | A1 * | 12/2003 | Kjeldsen et al. | 375/259 |
| 2010/0195563 | A1 * | 8/2010 | Jong et al. | 370/321 |

FOREIGN PATENT DOCUMENTS

KR 1020080025667 A 3/2008

* cited by examiner

*Primary Examiner* — Ted Wang
(74) *Attorney, Agent, or Firm* — Kile Park Reed & Houtteman PLLC

(57) ABSTRACT

The method includes performing a wired back-to-back test by forming M wired paths connecting one of the N transmission antennas with the M reception antennas through M cables, separating $i^{th}$ digital data corresponding to an $i^{th}$ receiver wired path from the plurality of digital data stored in the receiver wherein i is a natural number greater than 1 and smaller than M, extracting a time delay by decimating the separated $i^{th}$ digital data and performing sliding correlation on the decimated data, and extracting attenuation and phase characteristics of the $i^{th}$ receiver wired path by extracting samples after the time delay among the decimated samples.

10 Claims, 13 Drawing Sheets

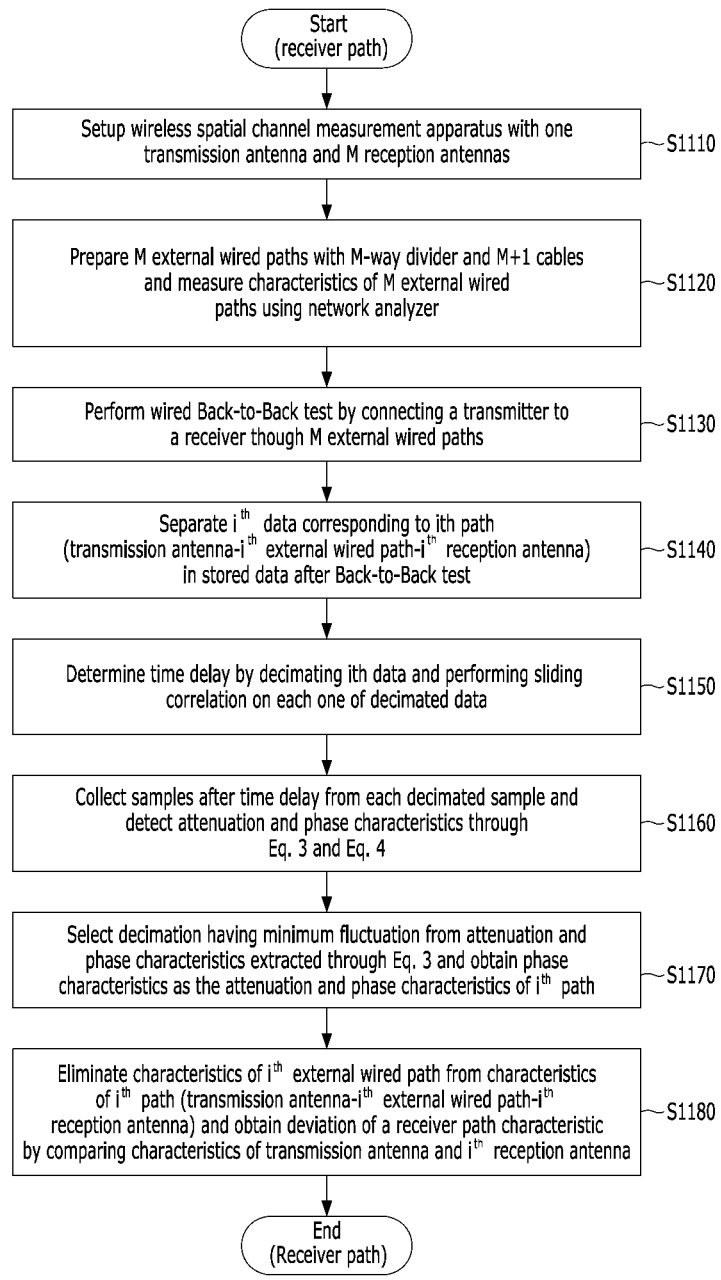

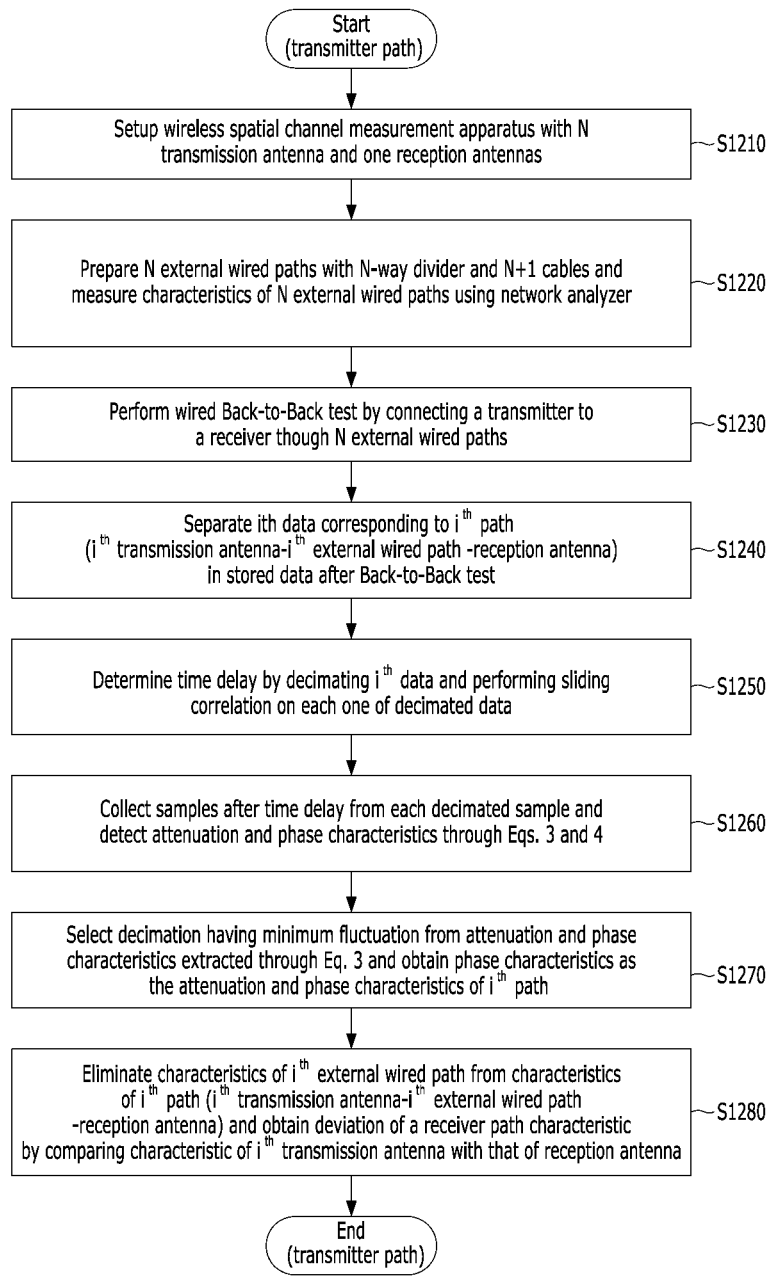

CALIBRATION METHOD FOR TX/RX PATH CHARACTERISTIC OF CHANNEL SOUNDER

CROSS-REFERENCE TO RELATED APPLICATIONS

The present application claims priority of Korean Patent Application No. 10-2009-0128524, filed on Dec. 21, 2009, which is incorporated herein by reference in its entirety.

BACKGROUND OF THE INVENTION

1. Field of the Invention

Exemplary embodiments of the present invention relate to a method for calibrating path characteristics of a transmitter and a receiver of a wireless spatial channel measurement apparatus such as a wireless channel sounder; and, more particularly, to a method for calibrating Tx/Rx path characteristics of a wireless spatial channel measurement apparatus using a multiple antenna.

2. Description of Related Art

Many studies have been in progress to develop a method for transmitting mess amount of data through a limited wireless channel in a next generation mobile communication system. As a result, many transmission methods have been introduced. In developing the next generation mobile communication system, it is required to accurately analyze characteristics of wireless spatial channels. Especially, it is required to analyze a wireless spatial channel in order to effectively apply a multi-antenna technology to the next generation mobile communication system.

For example, it is required to accurately estimate a wireless spatial channel to normally transmit data using the multi-antenna technology. In a mobile communication system for transmitting and receiving data using the multi-antenna technology, a transmitter transmits data through a wireless spatial channel by transforming a baseband signal to an intermediate frequency signal and transforming the intermediate frequency signal to a radio frequency signal (RF). A receiver receives data by transforming a RF signal transmitted through a wireless spatial channel to an intermediate frequency signal and transforming the intermediate frequency signal to a baseband signal.

As described above, it is required to transform a signal to a predetermined frequency band signal in order to transmit data through a wireless spatial channel using a multi-antenna technology in a mobile communication system. When the signal is transformed to the corresponding frequency band signal, the signal may be disadvantageously distorted. Also, the mobile communication system is disadvantageously required to have additional devices for transforming a signal to a corresponding frequency band signal. Accordingly, the complexity of a system may be increased.

A wireless spatial channel of a mobile communication system has a variable communication environment that varies in real time. Such a variable communication environment distorts a signal. Data transmission and reception performance depends not only on properties of multi-antenna transmitting and receiving data but also on characteristics of a wireless spatial channel. Therefore, it is required to accurately measure a wireless spatial channel and calibrate a path formed between a transmitter and a receiver based on the measurement result in order to transmit mess amount of data at a high speed through a limited wireless spatial channel using a multi-antenna technology in a wireless communication system.

That is, it is required to develop a method for minimizing distortion of a signal at a path formed between a transmitter and a receiver by accurately measuring a wireless spatial channel for transmitting data in a mobile communication system and for calibrating characteristic of a path of a transmitter and a receiver for minimizing the complexity of the system. In addition, it is required to develop a method for calibrating path characteristics by accurately and effectively measuring and analyzing characteristics of a wireless spatial channel for transmitting data in a mobile communication system and properties of a transmitter and a receiver, for example, properties of a plurality of transmission and reception antennas for transmitting data.

SUMMARY OF THE INVENTION

An embodiment of the present invention is directed to a method for detecting Tx/Rx path characteristics of a wireless spatial channel measurement system including active elements without disassembling the wireless spatial channel measurement apparatus at a predetermined interval.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for calibrating a path characteristic of a receiver of a wireless spatial channel measurement apparatus which includes a transmitter for transmitting a spread spectrum signal through N transmission antennas and the receiver for receiving the spread spectrum signal received through M reception antennas, converting the received signal to a plurality of digital data, and storing the digital data where M and N are an natural number, the method includes: performing a wired back-to-back test by forming M wired paths connecting one of the N transmission antennas with the M reception antennas through M cables; separating ith digital data corresponding to an ith receiver wired path from the plurality of digital data stored in the receiver wherein i is a natural number greater than 1 and smaller than M; extracting a time delay by decimating the separated ith digital data and performing sliding correlation on the decimated data; and extracting attenuation and phase characteristics of the ith receiver wired path by extracting samples after the time delay among the decimated samples.

In accordance with an embodiment of the present invention, a method for calibrating a path characteristic of a transmitter of a wireless spatial channel measurement apparatus which includes the transmitter for transmitting a spread spectrum signal through N transmission antennas and a receiver for receiving the spread spectrum signal received through M reception antennas, converting the received signal to a plurality of digital data, and storing the digital data where M and N are an natural number, the method includes: performing a wired back-to-back test by forming N wired paths connecting the N transmission antennas with one of the M reception antennas through N cables; separating ith digital data corresponding to an ith transmitter wired path from the plurality of digital data stored in the receiver wherein i is a natural number greater than 1 and smaller than N; extracting a time delay by decimating the separated ith digital data and performing sliding correlation on the decimated data; and extracting attenuation and phase characteristics of the ith transmitter wired path by extracting samples after the time delay among the decimated samples.

BRIEF DESCRIPTION OF THE DRAWINGS

FIG. 14 is a flowchart illustrating a method of obtaining path deviation of a receiver when the receiver uses multiple antennas in a wireless spatial channel measurement apparatus.

FIG. 15 is a flowchart illustrating a method of obtaining path deviation of a transmitter when the transmitter uses multiple antennas in a wireless spatial channel measurement apparatus.

DESCRIPTION OF SPECIFIC EMBODIMENTS

Figure 1:
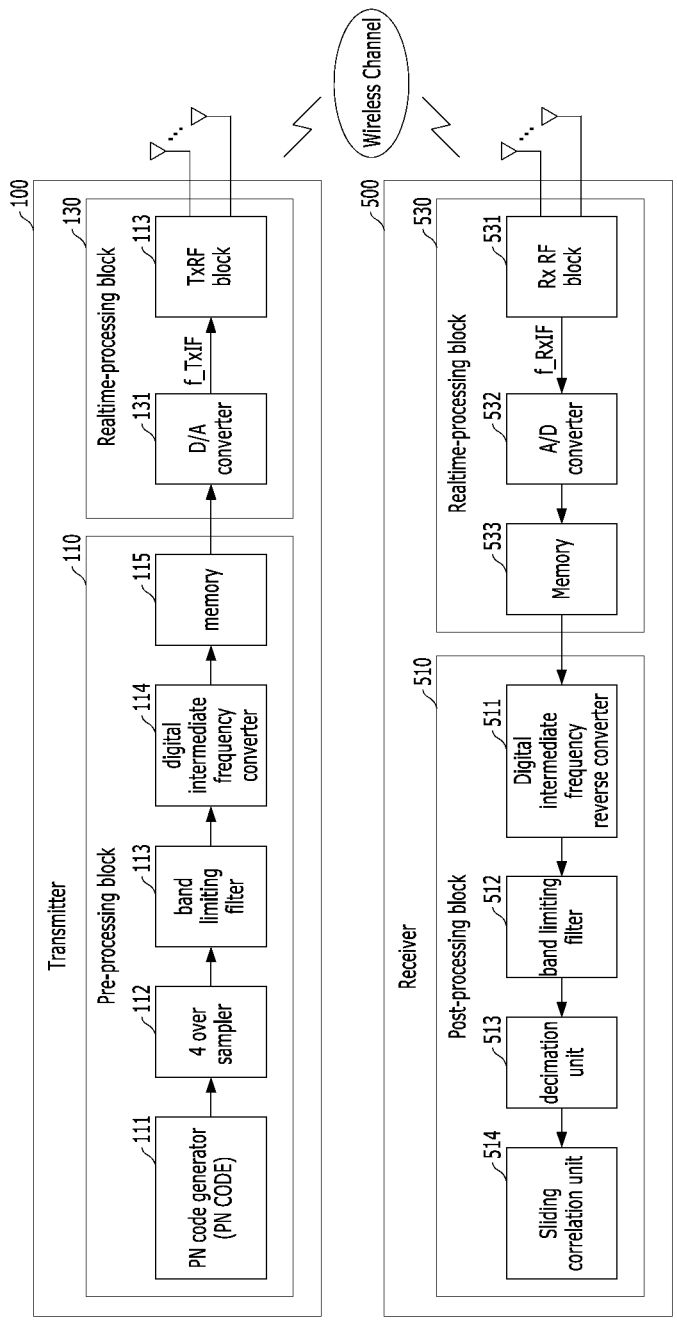
FIG. 1 is a diagram illustrating a wireless spatial channel measurement apparatus in a wireless communication system in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

The present invention relates to a method for calibrating a patch characteristic of a receiver and a transmitter of a Pseudorandom binary sequence (PRBS) wireless spatial channel measurement apparatus using one sequence for measuring a wireless spatial channel as a spread spectrum sequence.

FIG. 1 is a diagram illustrating a wireless spatial channel measurement apparatus in a wireless communication system in accordance with an embodiment of the present invention.

Referring to FIG. 1, the wireless spatial channel measurement apparatus in accordance with an embodiment of the present invention includes a transmitter 100 and a receiver 500.

The transmitter 100 includes a pre-processing block 110 and a realtime-processing block 130.

The pre-processing block 110 of the transmitter 110 includes a pseudo noise (PN) code generator 111, a 4-over sampler 112, a band limiting filter 113, a digital intermediate frequency converter 114, and a memory 115. The pre-processing block 110 generates a measurement sequence and stores it in the memory 115. The measurement sequence is generated by performing a 4-over sampling process on one sequence for measuring a wireless spatial channel at the 4-over sampler 112, filtering the sampling result through the band limiting filter 113 and up-converting the filtering result to an intermediate frequency for transmission at the digital intermediate frequency converter 114.

The realtime processing block 130 includes a digital to analog (D/A) converter 131 and a TxRF block 132. The realtime-processing block 130 performs related operations when a wireless spatial channel is measured. Here, the D/A converter 131 of the realtime-processing block 130 converts the measurement sequence stored in the memory 115 of the pre-processing block 110 to an intermediate frequency analog signal (f_TxIF) for transmission at an operation speed of the D/A converter 131. The TxRF block 132 filters and up-converts the converted measurement sequence to carrier frequency, thereby outputting a measurement signal. Such a measurement signal is transmitted through a transmission antenna.

Meanwhile, the receiver 500 analyzes a measurement signal received through a reception antenna. Such a receiver 500 includes a realtime-processing block 530 and a post-processing block 510.

The realtime-processing block 530 includes an RxRF block 531, an analog to digital (A/D) converter 532, and a memory 533.

When the wireless spatial channel is measured, the RxRF block 531 down-converts the measurement signal received through the reception antenna to an intermediate frequency (f_RxIF) signal and the A/D converter 532 converts the intermediate frequency signal (f_RxIF) to digital data at an operation speed of the A/D converter 532. The A/D converter 532 stores the converted digital data at a memory thereof in realtime.

The realtime-processing block 530 stores the digital data (measurement signal) stored in the memory of the A/D converter 532 into the memory 533 when the realtime-processing block 530 determines that a predetermined amount of the digital data is obtained. The A/D converter 532 stops the operation thereof while the digital data (measurement signal) is stored in the memory 533. After storing the digital data in the memory 533, the above described operation repeats for a received measurement signal.

After measuring a wireless spatial channel several times, the receiver 500 analyzes the digital data (measurement signal) stored in the memory 533 through the post-processing block 510 and determines the characteristics of the wireless spatial channel. The post-processing block 510 includes a digital intermediate frequency reverse converter 511, a band limiting filter 512, and a decimation unit 513. Those elements of the post-processing block 510 perform reverse operations corresponding to the pre-processing block of the transmitter 100. Accordingly, the detailed descriptions thereof are omitted herein.

In FIG. 1, it is assumed that the digital intermediate frequency scheme 114 or 511 is applied to the transmitter 100 and the receiver 500. Further, it is also assumed that 4-over sampling 112 is applied to the transmitter 100. The digital intermediate frequency scheme is applied to the transmitter 100 in order to accurately obtain a measurement signal passing through a wireless spatial channel. If an analog intermediate frequency (IF) scheme is used in the receiver 500, the measurement signal may be distorted. That is, when the receiver 500 uses the analog IF scheme, the measurement signal is converted from an intermediate frequency analog signal to a baseband In-phase (I-phase) signal and a baseband quadrature-pahse (Q-phase) signal. During conversion, the measurement signal may be distorted.

The reason of applying the 4-over sampling will be described as follows. The transmitter 100 is required to have an over sampler 112 and a band limiting filter 113 to use the digital IF scheme. Over sampling must be higher than 4 in order to prevent aliasing from generating at a spectrum regardless of characteristics of the band limiting filter 113 in the digital intermediate frequency scheme. If the over sampling is smaller than 4, aliasing may be generated although a predetermined intermediate frequency is selected and used according to the characteristics of the band limiting filter 113. Accordingly, the over sampling must not be smaller than 4. If the over sampling is larger than 4, it is possible to have a wide selection range of an intermediate frequency not generating aliasing regardless of the characteristics of the band limiting filter 113. However, the D/A converter 131 is required to have a fast operation speed due to the increment of over sampling times.

Accordingly, the 4-oversampling is proper because it is not necessary to perform over sampling more than necessary. In order to prevent aliasing from generation regardless of the characteristics of the band limiting filter 113 during 4-over sampling, the intermediate frequency for transmission must be ¼ of the operation speed (f_D/A) of the D/A converter 131. In this case, a calculation amount is also reduced as shown in Eq. 1.

$$\text{(digital } IF \text{ processing)} = \text{sequency}(n) \times \cos\left(2\pi f_{IF} \frac{n}{f_{D/A}}\right) \quad \text{Eq. 1}$$

$$\text{where if } f_{IF} = \frac{f_{D/A}}{4} \text{ then } \cos\left(2\pi f_{IF} \frac{n}{f_{D/A}}\right) = \cos\left(\frac{n\pi}{2}\right).$$

In Eq. 1, when the intermediate frequency is ¼ of the operation speed (f_D/A) of the D/A converter 131, it repeats as [1, 0, −1, 0]. Accordingly, the digital intermediate frequency scheme may be easily and effectively applied due to small calculation amount.

Meanwhile, the transmitter 100 may use an analog intermediate frequency scheme. In this case, the transmitter 100 is required to perform a sample and hold (S/H) operation of the D/A converter and to perform an over sampling operation and a band limiting filtering operation to reduce signal distortion caused by analog filtering after the operation of the D/A converter. If the transmitter 100 is also required to perform the over sampling operation and the band limiting filtering operation, it may be preferred to select the digital intermediate frequency scheme rather than the analog intermediate scheme that may generate distortion in a frequency conversion process like the receiver 500.

As described above, the intermediate frequency for transmission becomes identical to a measurement bandwidth if 4-over sampling is used and the intermediate frequency for transmission is set up as ¼ of the operation speed (f_D/A) of the D/A converter 131 for the measurement bandwidth.

Meanwhile, it is assumed that a pseudo random binary sequence (PRBS) scheme is applied to the wireless spatial channel measurement apparatus of FIG. 1. The PRBS scheme uses one sequence as a spread spectrum sequence.

In FIG. 1, the wireless spatial channel measurement apparatus in accordance with an embodiment of the present invention uses multiple antennas. That is, the transmitter 100 includes N transmission antennas and the receiver 500 includes M reception antennas.

In the wireless spatial channel measurement apparatus using the multiple antennas, the transmitter 100 transmits a measurement signal using N transmission antennas through time division, and the receiver 500 receives the measurement signal using M reception antennas through time division scheme. The receiver 500 detects the wireless channel characteristics by processing the digital data (measurement signal) stored in the memory 533 through the post-processing block 510, thereby obtaining characteristics of the wireless spatial channel. Here, the receiver 500 may receive signals through M reception antennas at the same time. In this case, the cost of the receiver 500 increases because the receiver 500 is required to have M A/D converters 532.

Meanwhile, the post-processing block 510 obtains the wireless spatial channel characteristics from the digital data (measurement signal) stored in the memory 533 of the real-time-processing block 530 of the receiver 500. Wireless spatial channel parameters include a direction of departure (DoD) and a direction of arrival (DoA). In order to accurately extract the DoD and the DoA, it is necessary to accurately detect path characteristics of the wireless spatial channel measurement apparatus and characteristics of transmission/reception antennas.

In case of transmission/reception antennas, the antenna characteristics are measured in an antenna range such as an anechoic chamber as an entire multi-antenna shape including a feeding cable for being connected to the transmitter 100 and the receiver 500 of the wireless spatial channel measurement apparatus. Then, the post-processing block 510 reflects the characteristics of N transmission antennas and M reception antennas of the multi-antenna shape.

However, since the transmitter 100 uses the N antennas through time division, N Rx path characteristics deviations are generated at the Tx RF block 132 having a RF switch in FIG. 1. Also, M Rx path characteristic deviations are generated at the Rx RF block 531 including a RF switch of the receiver 500 because the receiver 500 include M reception antennas through time division.

Since the transmission/reception antennas are formed of passive elements, the measured antenna characteristics are not changed if the configuration thereof is not changed after measuring the characteristics of the multi-antenna including a feed cable. However, since the transmitter 100 and the receiver 500 include active elements, the antenna characteristics may be changed while measuring a wireless spatial channel. Therefore, N Tx path characteristic deviations and M Rx path characteristic deviations may be calibrated by measuring characteristics of the Tx RF block 132 and the Rx RF block 531 before the wireless spatial channel measurement apparatus is assembled. However, such calibration is meaningless if the characteristics are changed after the wireless spatial channel measurement apparatus is assembled. That is, the DoD and the DoA are inaccurately extracted. It will be described in more detail hereinafter.

For example, a wireless spatial channel is measured at a plurality of sites for a comparatively long measuring period such as one month. Since the transmission/reception antennas are formed of only passive elements, it is assumed that the characteristics thereof will be not changed during the measuring period unless the configuration thereof is changed by disassembling. Accordingly, the characteristics of the transmission/reception antennas are measured before measuring the wireless spatial channel and the measured antenna characteristics are reflected in a post-processing block.

However, in case of the wireless spatial channel measurement apparatus including active elements, the path characteristics of the transmitter 100 and the receiver 500 may be changed during the long measuring period. Therefore, in order to accurately calibrate the characteristics deviations, it is required to disassemble the wireless spatial channel measurement apparatus at a predetermined interval, for example, at every measurement sites and to measure the characteristics of the Tx RF block 132 and the Rx RF block 531. After measuring, it is also required to reassemble the wireless spatial channel measurement apparatus.

Hereinafter, a method of calibrating path characteristics of the transmitter 100 and the receiver 500 in accordance with an embodiment of the present invention will be described in detail. In an embodiment of the present invention, the path characteristics of the transmitter 100 and the receiver 500 are calibrated after measuring a wireless spatial channel by applying a PRBS scheme using one sequence as a spread spectrum sequence. Here, it is assumed that the A/D converter 532 of the receiver 500 carries out a 4-over sampling operation like the 4-over sampler 112 of the transmitter 100.

Figure 2:
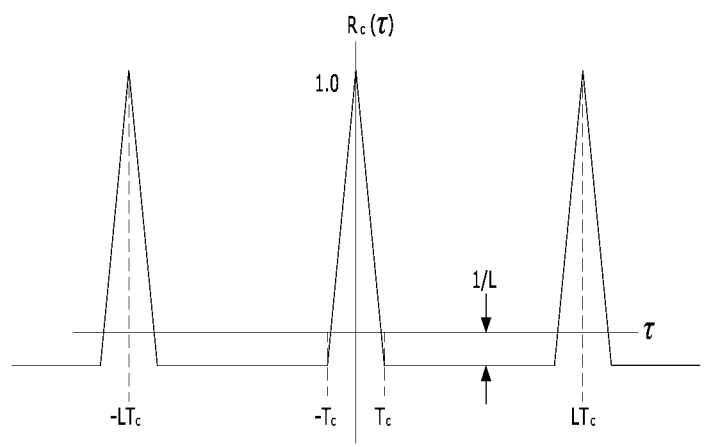
FIG. 2 is a graph illustrating autocorrelation function characteristics of a spread spectrum signal.

In the PRBS wireless spatial channel measurement apparatus of FIG. 1, channel parameters obtained through the post-processing block 510 include a delay profile. The delay profile is based on an autocorrelation of a spread spectrum sequence as shown in Eq. 2 and FIG. 2.

$$R_c(\tau) = \begin{cases} 1 - \dfrac{L+1}{L \cdot T_c}|\tau|, & |\tau| \leq T_c \\ -\dfrac{1}{L}, & \text{the remain of the period} \end{cases} \quad \text{Eq. 2}$$

In Eq. 2, $T_c$ denotes chip duration of a spread spectrum sequence, and L denotes a period of a spread spectrum sequence.

The transmitter 100 of the PRBS wireless spatial channel measurement apparatus shown in FIG. 1 repeatedly transmits a spread spectrum signal (measurement signal) of one period. Then, the receiver 500 receives the spread spectrum signal with a predetermined time delay ($T_{delay}$).

Here, $T_{delay}$ is smaller than $LT_c$. That is, the received spread spectrum signal with the time delay is passed through a sliding correlation unit 514 in the post-processing block 510 of the receiver 500 and becomes a signal shown in FIG. 3.

Figure 3:
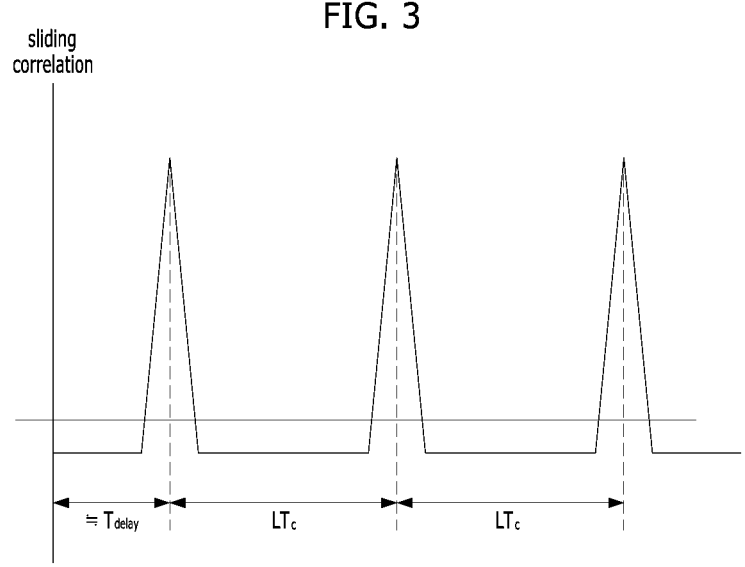
FIG. 3 is a graph showing a result of PRBS sliding correlation.

If one time delay ($T_{delay}$) is generated as shown in FIG. 3, a received baseband measurement signal $r_c(t)$ after the time delay (Tdelay) may be obtained from received entire baseband measurement signals corresponding to transmitted baseband measurement signals $s_c(t)$ where the spread spectrum signal is repeatedly transmitted. Since the received baseband measurement signal $r_c(t)$ satisfies relation of Eq. 3, it is possible to extract attenuation characteristic ($\alpha$) and phase characteristic ($\theta$) of a path having one time delay ($T_{delay}$)

$$r_c(t) = (\alpha \cdot e^{j\theta}) \cdot s_c(t) \quad \text{Eq. 3}$$

The calibration method in accordance with an embodiment of the present invention is based on a wired back-to-back test. The wired back-to-back test includes only one time delay ($T_{delay}$). Accordingly, it is possible to detect deviation in path characteristics of the transmitter 100 and the receiver 500 of the wireless spatial channel measurement apparatus. Hereinafter, it will be described in detail.

When the transmitter 100 uses one transmission antenna and the receiver 500 uses a plurality of reception antennas, the calibration method in accordance with an embodiment of the present invention calibrates multi-path deviation of the receiver 500. When the receiver 500 uses one reception antenna and the transmitter 100 uses a plurality of transmission antennas, the calibration method in accordance with an embodiment of the present invention performs the same operation to calibrate the multi-path deviation of the transmitter 500. Therefore, the method for calibrating multi path deviation of the transmitter 100 in accordance with an embodiment of the present invention will be described. However, the description of the method for calibrating multi path deviation of the receiver 500 in accordance with an embodiment of the present invention is omitted.

When the wireless spatial channel measurement apparatus includes one transmission antenna and M reception antennas, the wired back-to-back test is prepared by connecting a port of the transmission antenna with an M-way power divider through a RF cable and by connecting ports of the reception antennas with the M-way power divider through M RF cables in parallel.

Then, M path characteristics (($\alpha_1, \theta_1$), ($\alpha_2, \theta_2$), ..., ($\alpha_M, \theta_M$)) between the transmission antenna and each one of M reception antennas are extracted through Eq. 3. For example, the M characteristics (($\alpha_1, \theta_1$), ($\alpha_2, \alpha_2$), ..., ($\alpha_M, \theta_M$)) are extracted from a first path from the transmission antenna to a first reception antenna through a first external wired path 1, a second path from the transmission antenna to a second reception antennas through a second external wired path 2, ..., and a $M^{th}$ path from the transmission antenna to a $M^{th}$ reception antennas through a $M^{th}$ external wired path M. Since there is only one delay time as the characteristics of the external wired paths 1 to M, it is possible to detect M reception path characteristic deviation.

A procedure of processing signal to extract the path characteristics (($\alpha_1, \theta_1$), ($\alpha_2, \theta_2$), ..., ($\alpha_M, \theta_M$)) will be described hereinafter.

Figure 4:
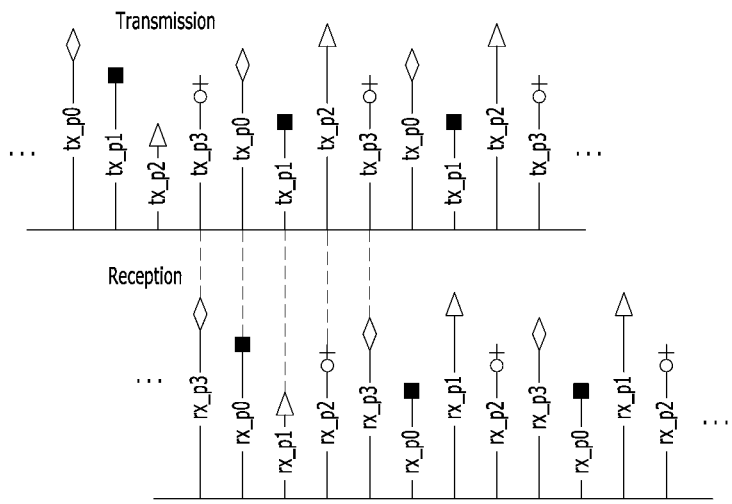
FIG. 4 is a graph showing transmission samples synchronized with reception samples.

Since it is expected that one sequence transmitted from the transmitter 100 is in one decimation phase, the 4-over sampling is performed in the A/D converter 532 of the receiver 500. That is, it is expected that a signal transmitted from the transmitter 100 is matched with a reception sample of a signal received at the receiver as shown in FIG. 4. A transmission sample shown in FIG. 4 is a result of band limiting filtering after the 4-over sampling performed on a spread spectrum signal. A reception sample shown in FIG. 4 is a result of down-converting to a baseband using a digital intermediate frequency scheme after performing the 4-over sampling at the A/D converter 532.

The graph of FIG. 4 shows a spread spectrum signal tx_p0, which is a signal before performing the 4-over sampling and the band limiting filtering, and a 4-over sampled reception sample rx_p3, which corresponds to the spread spectrum signal tx_p0. In this case, the attenuation characteristics and the phase characteristics thereof can be extracted using Eq. 3 based on a decimation phase 3.

Figure 5:
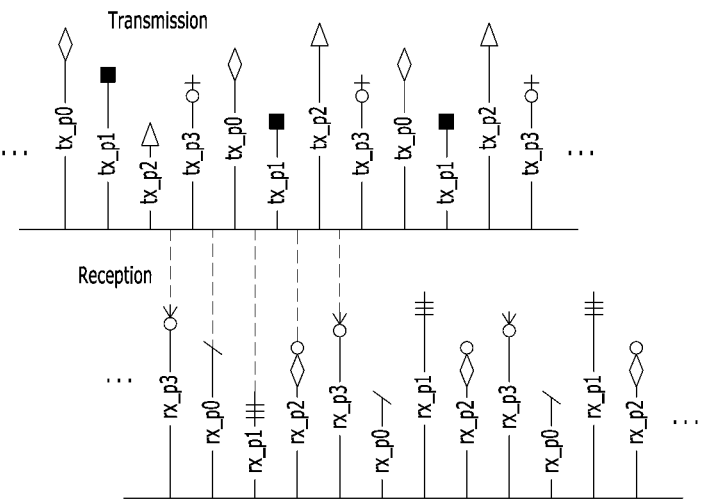
FIG. 5 is a graph illustrating transmission samples not synchronized with reception samples.

However, since it is extremely rare that a time delay of a transmission (Tx) path and a reception (Rx) path becomes an integer time of a sample interval as shown in FIG. 4, it is normal that the transmission sample is not synchronized with the reception sample as shown in FIG. 5. If the attenuation and phase characteristics are extracted using Eq. 3 in this case, fluctuation is generated in the attenuation and phase characteristics.

In order to overcome the fluctuation problem in the attenuation and phase characteristics of paths between the transmitter and receiver, the attenuation characteristic is determined by setting up a time window as shown in FIG. 4 and calculating a linear average thereof. When the attenuation and phase characteristics are extracted by Eq. 3, the number of samples in a range from a maximum phase value ($\theta_{max}$) to a reference value ($\theta_{tolerance}$) is counted and the number of samples in a range from a minimum phase value ($\theta_{min}$) to a reference value ($\theta_{tolerance}$) is counted. Then, a phase belonging to one having the larger number of samples between the ranges is determined as a phase characteristic of a path. For example, when more samples are included in the range from the maximum phase value ($\theta_{max}$) of phase to the reference value ($\theta_{tolerance}$), the maximum phase value ($\theta_{max}$) is determined as a phase characteristic of a path.

$$\begin{cases} \alpha = \text{average}(\alpha(nT_c)), \quad \theta = \begin{cases} \theta_{max}, & \text{if } n1 > n2 \\ \theta_{min}, & \text{if } n1 > n2 \end{cases} \\ \text{where,} \\ n1 = \text{number}[\theta(nT_c) \geq (\theta_{max} - \theta_{tolerance})] \\ n2 = \text{number}[\theta(nT_c) \geq (\theta_{min} + \theta_{tolerance})] \\ \theta_{max} = \max[\theta(nTc)], \theta_{min} = \min[\theta(nT_c)] \end{cases}$$

for $T_{window}$(time window)   Eq. 4

Hereinafter, the above described signal processing method will be described in detail.

It is assumed that a chip rate of a spread spectrum sequence is 20 MHz, an operation speed of the D/A converter of the transmitter is 80 MHz, and an operation speed of the A/D converter of the receiver is 80 MHz. Further, it is also assumed that a time delay is about 200 ns and attenuation and phase characteristics are changed 6 times. Each time, the attenuation and phase characteristics are changed about 2 dB and 30 degree.

Figure 6:
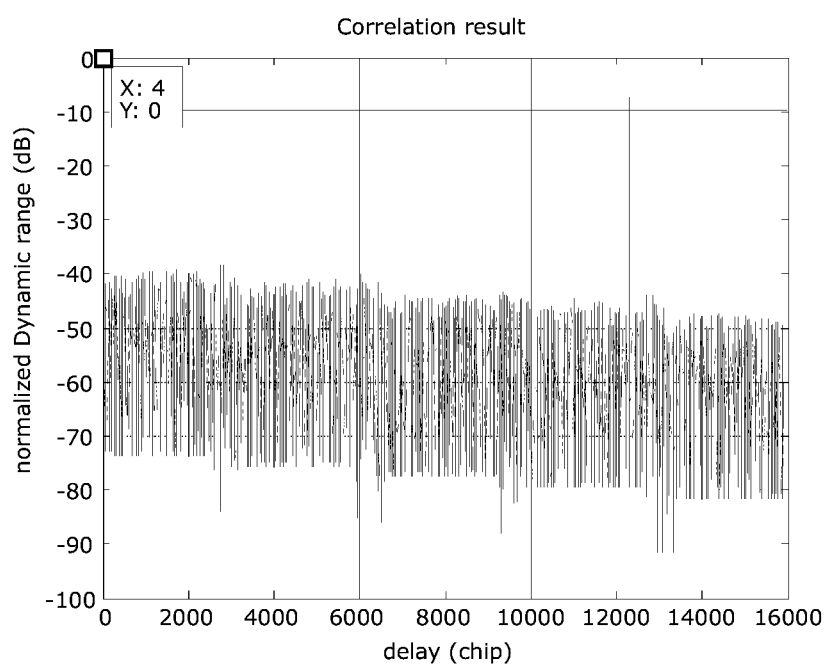
FIG. 6 is a graph showing sliding correlation result when transmission samples synchronized with reception samples as shown in FIG. 4.

When a decimation phase 3 is obtained under the state shown in FIG. 4, a result of sliding correlation can be obtained as shown in FIG. 6.

Figure 7:
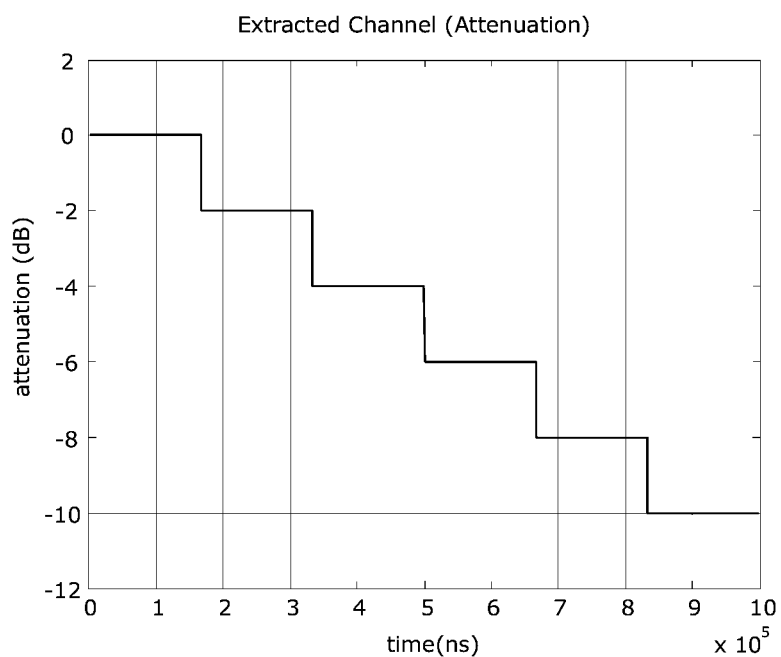
FIGS. 7 to 8 are graphs showing attenuation and phase characteristics extracted using Eq. 3 when transmission samples are synchronized with reception samples as shown in FIG. 4.
Figure 8:
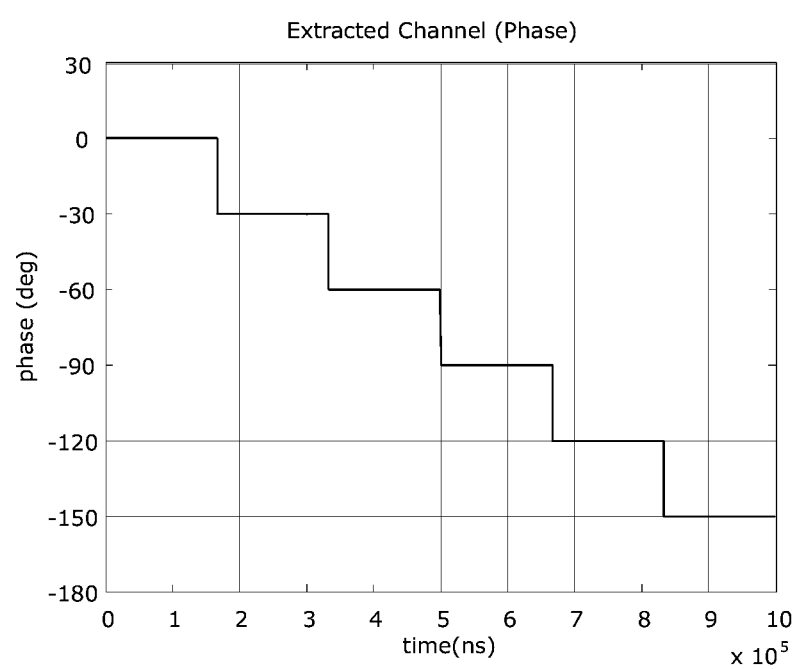

Referring to FIG. 6, since a time delay is known, the attenuation and phase characteristics can be extracted using Eq. 3 by obtaining only a $5^{th}$ sample from decimation phase 3 samples. Graphs of FIGS. 7 and 8 show the extracted attenuation and phase characteristics. That is, the graphs of FIGS. 7 and 8 clearly show that the setup attenuation and phase characteristics are accurately extracted.

Meanwhile, when it is assumed that one providing the best result among decimation phases 0, 1, 2, and 3 in FIG. 5 is identical to the rx_p1 of FIG. 4, the graph of FIG. 8 shows the result of sliding correlation.

Figure 9:
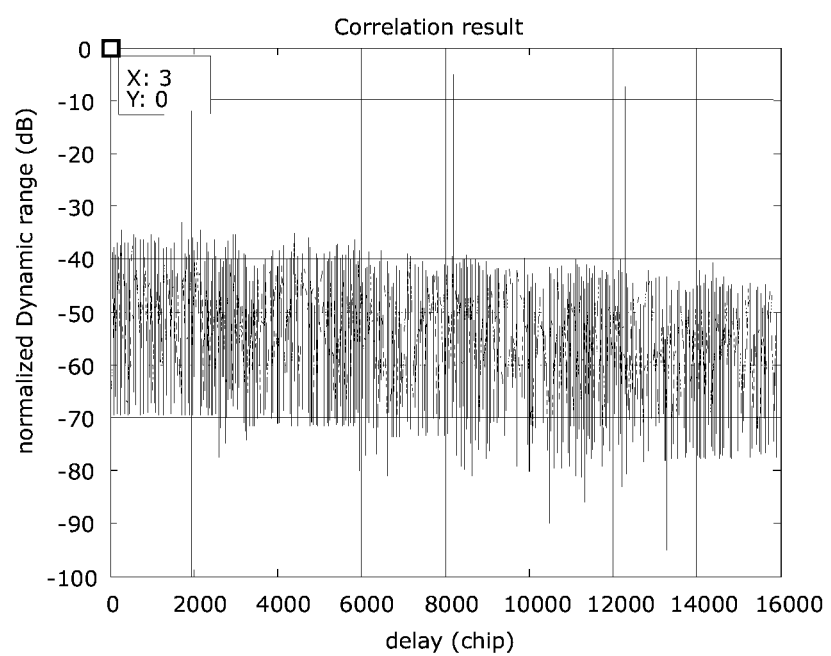
FIG. 9 is a graph showing a result of sliding correlation when transmission samples not synchronized with reception samples as shown in FIG. 5.
Figure 10:
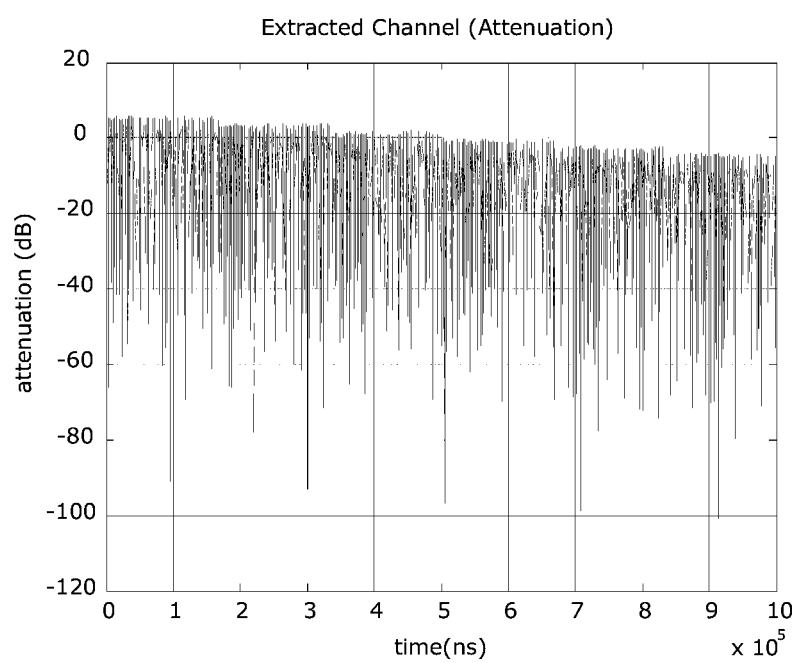
FIGS. 10 and 11 are graphs showing attenuation and phase characteristics extracted using Eq. 3 when transmission samples are not synchronized with reception samples as shown in FIG. 5.
Figure 11:
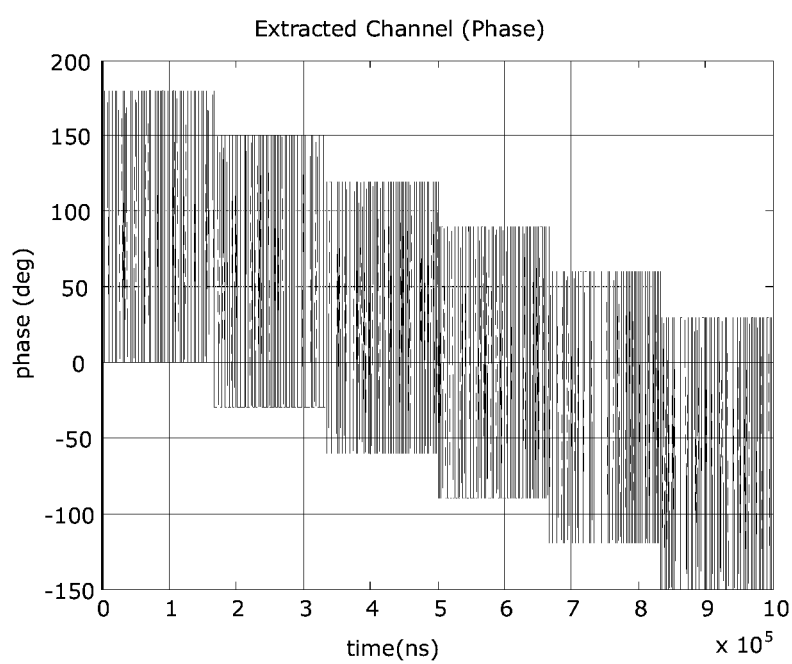

Referring to FIG. 9, since a time delay is known, attenuation and phase characteristics can be extracted using Eq. 3 by obtaining a $4^{th}$ sample from decimation samples. Graphs of FIGS. 10 and 11 show that the extracted attenuation and phase characteristics have fluctuation. That is, FIGS. 10 and 11 clearly show that the setup attenuation and phase characteristics are not accurately extracted.

Figure 12:
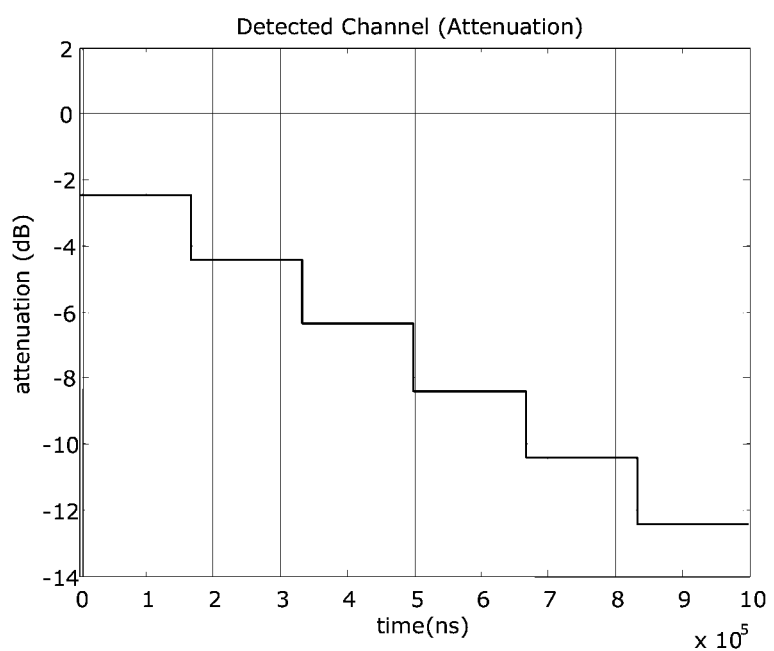
FIGS. 12 and 13 are graphs illustrating attenuation and phase characteristics extracted using Eq. 4.
Figure 13:
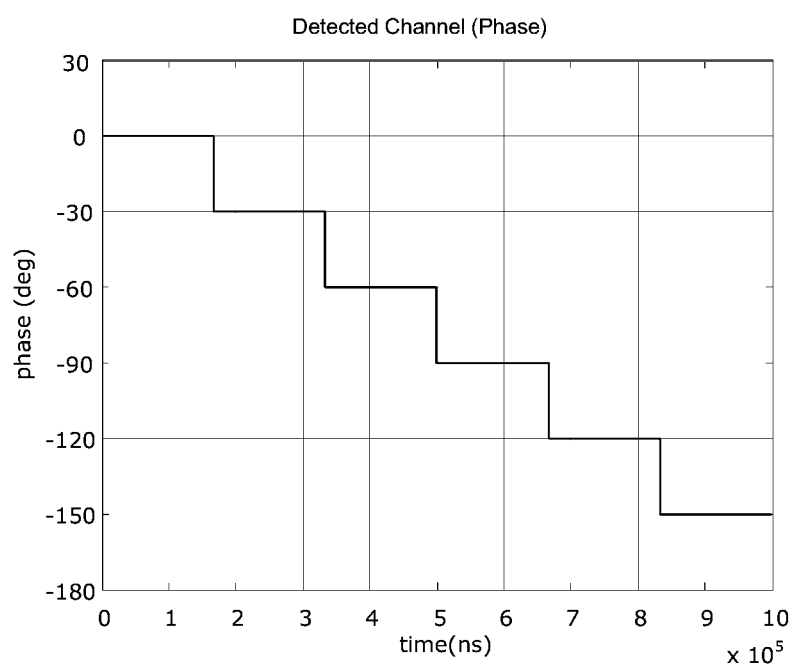

When attenuation and phase characteristics are detected by performing a signal processing procedure of Eq. 4, the phase characteristics are accurately detected and the attenuation characteristics are detected with offset as shown in FIGS. 12 and 13.

Meanwhile, when the transmitter 100 includes one transmission antenna and the receiver 500 includes one reception antenna in the wireless spatial channel measurement apparatus of FIG. 1, a path characteristic from one transmission antenna port to one reception antenna port is constant. Accordingly, a time window of Eq. 4 can be set up using a reception time, for example, from the transmission antenna port to the reception antenna port. That is, there is no strict limitation for setting up a time window.

In FIGS. 12 and 13, an offset of attenuation characteristic is always generated when a transmitted one sequence is accurately obtained. In this case, deviation between offsets is about 1 dB. Accordingly, such offset can be ignored to detect deviation of path characteristics according to an embodiment of the present invention.

Until now, fundamental concept and required signal processing for calibrating characteristic deviations of paths of transmitter/receiver of a wireless spatial channel measurement apparatus through a wired back-to-back test in accordance with an embodiment of the present invention. Such a concept and signal processing may be expressed as flowcharts of FIGS. 14 and 15. Hereinafter, a method for calibrating path characteristics in accordance with an embodiment of the present invention will be described with reference to FIGS. 14 and 15.

FIG. 14 is a flowchart illustrating a method for obtaining a path characteristic deviation of a receiver using multiple antennas in a wireless spatial channel measurement apparatus. FIG. 15 is a flowchart illustrating a method for obtaining a path characteristic deviation of a transmitter using multiple antennas in a wireless spatial channel measurement apparatus. In the flowcharts in FIGS. 14 and 15, methods for obtaining path characteristic deviation of the transmitter and the receiver are identical to each other. Accordingly, the flowchart of FIG. 14 is only described.

At step S1110, a wireless spatial channel measurement apparatus is set up to have one transmission antenna and M reception antennas. That is, the transmitter 100 is configured to include one transmission antenna and the receiver 500 is configured to include M reception antennas in the wireless spatial channel measurement apparatus of FIG. 1.

At step S1120, M external wired paths are prepared using an M-way power divider and M+1 RF cables, and characteristics of the M external wired paths are measured using a network analyzer. That is, one RF cable is prepared to connect the transmission antenna of the transmitter 100 and the M-way power divider, and M RF cables are prepared to connect the M reception antennas of the receiver 500 and the M-way power divider. Then, the transmission antenna is connected to the M-way power divider through the RF cable, and the M reception antennas of the receiver are connected to the M-way power divider through the M RF cables. After connecting, the characteristics of the M wired paths are measured using the network analyzer.

At step S1130, the transmitter and the receiver of the wireless spatial channel measurement apparatus are connected using the M external wired paths, and a wired back-to-back test is performed.

At step S1140, digital data i of a $i^{th}$ path is separated from digital data stored in a memory as a result of the wired back-to-back test. That is, digital data i corresponding to a predetermined path such as the $i^{th}$ path is extracted from digital data stored in the memory 533 of the wireless spatial channel measurement apparatus of FIG. 1. Here, i is greater than 1 and smaller than M.

At step S1150, one time delay is determined by decimating the extracted digital data i and performing sliding correlation on the decimated data.

At step S1160, samples after the obtained one time delay are selected from the decimated samples and attenuation and phase characteristics of the selected samples are detected using Eq. 3 and Eq. 4.

At step S1170, decimation having less fluctuation is determined from the extracted attenuation and phase characteristics, and attenuation and phase characteristics are detected from the determined decimation using Eq. 4 and the detected attenuation and phase characteristics are determined as the attenuation and phase characteristics of the $i^{th}$ path.

At step S1180, the characteristics of the $i^{th}$ external path are eliminated from the characteristics of the $i^{th}$ path from the transmission antenna to the reception antenna through the $i^{th}$ external wired path, and the characteristics of the transmission antenna are ith compared with the characteristics of the reception antenna, thereby obtaining deviation of path characteristics of the receiver.

According to the flowcharts shown in FIGS. 14 and 15, a path characteristic deviation of the receiver and a path characteristic deviation of the transmitter of the wireless spatial channel measurement apparatus using multiple antennas can be obtained. Therefore, after measuring the wireless spatial channel, calibration can be performed by reflecting the measurement result into the process for obtaining DoD and DoA.

As described above, path characteristics of the transmitter and the receiver of the wireless spatial channel measurement apparatus including the active element are detected without disassembling the wireless spatial channel measurement apparatus at a predetermined invention, and deviation thereof can be calibrated in accordance with an embodiment of the present invention.

While the present invention has been described with respect to the specific embodiments, it will be apparent to those skilled in the art that various changes and modifications may be made without departing from the spirit and scope of the invention as defined in the following claims.

What is claimed is:

1. A method for calibrating a path characteristic of a receiver of a wireless spatial channel measurement apparatus which includes a transmitter for transmitting a spread spectrum signal through N transmission antennas and the receiver for receiving the spread spectrum signal received through M reception antennas, converting the received signal to a plurality of digital data, and storing the digital data where M and N are an natural number, the method comprising:

performing a wired back-to-back test by forming M wired paths connecting one of the N transmission antennas with the M reception antennas through M cables;

separating $i^{th}$ digital data corresponding to an $i^{th}$ receiver wired path from the plurality of digital data stored in the receiver wherein i is a natural number greater than 1 and smaller than M;

extracting a time delay by decimating the separated $i^{th}$ digital data and performing sliding correlation on the decimated data; and extracting attenuation and phase characteristics of the $i^{th}$ receiver wired path by extracting samples after the time delay among the decimated samples.

2. The method of claim 1, wherein in said extracting attenuation and phase characteristics, the attenuation and phase characteristics of the $i^{th}$ receiver wired path are extracted using equation of:

$$r_c(t) = (\alpha \cdot e^{j\theta}) \cdot s_c(t),$$

where $r_c(t)$ denotes a spread spectrum signal received after the time delay, $\alpha$ denotes an attenuation characteristic of the $i^{th}$ receiver wired path, $\theta$ is a phase characteristic of the $i^{th}$ receiver wired path, and $s_c(t)$ is the spread spectrum signal.

3. The method of claim 2, wherein a decimation having minimum fluctuation is detected from the extracted attenuation and phase characteristics of the $i^{th}$ receiver wired path, data from the detected decimation is used as data for detecting path characteristics of the receiver.

4. The method of claim 3, when the extracted attenuation and phase characteristics of the $i^{th}$ receiver wired path include the fluctuation, a linear average of the attenuation characteristic is obtained by setting up a time window using equation:

$$\text{for } T_{window}(\text{time window})$$

$$\begin{cases} \alpha = \text{average}(\alpha(nT_c)), & \theta = \begin{cases} \theta_{max}, & \text{if } n1 > n2 \\ \theta_{min}, & \text{if } n1 > n2 \end{cases} \\ \text{where,} \\ n1 = \text{number}[\theta(nT_c) \geq (\theta_{max} - \theta_{tolerance})] \\ n2 = \text{number}[\theta(nT_c) \geq (\theta_{min} + \theta_{tolerance})] \\ \theta_{max} = \max[\theta(nTc), \theta_{min} = \min[\theta(nT_c)] \end{cases}$$

where samples in a range from a maximum phase value ($\theta_{max}$) among the detected phases to a predetermined reference ($\theta_{tolerance}$) value and samples in a range from a minimum phase value ($\theta_{min}$) to the predetermined reference value ($\theta_{tolerance}$)) are counted, the phase characteristics in the range having more samples are decided as phase characteristics.

5. The method of claim 2, wherein predetermined attenuation and phase characteristics of the $i^{th}$ cable are eliminated from the attenuation and phase characteristics of the $i^{th}$ receiver wired path, and a path characteristic deviation of the receiver is obtained by comparing attenuation and phase characteristics between the transmission antenna and the $i^{th}$ reception antenna.

6. A method for calibrating a path characteristic of a transmitter of a wireless spatial channel measurement apparatus which includes the transmitter for transmitting a spread spectrum signal through N transmission antennas and a receiver for receiving the spread spectrum signal received through M reception antennas, converting the received signal to a plurality of digital data, and storing the digital data where M and N are an natural number, the method comprising:

performing a wired back-to-back test by forming N wired paths connecting the N transmission antennas with one of the M reception antennas through N cables;

separating $i^{th}$ digital data corresponding to an $i^{th}$ transmitter wired path from the plurality of digital data stored in the receiver wherein i is a natural number greater than 1 and smaller than N;

extracting a time delay by decimating the separated $i^{th}$ digital data and performing sliding correlation on the decimated data; and extracting attenuation and phase characteristics of the $i^{th}$ transmitter wired path by extracting samples after the time delay among the decimated samples.

7. The method of claim 6, wherein in said extracting attenuation and phase characteristics, the attenuation and phase characteristics of the $i^{th}$ transmitter wired path are extracted using equation of:

$$r_c(t) = (\alpha \cdot e^{j\theta}) \cdot s_c(t),$$

where $r_c(t)$ denotes a spread spectrum signal received after the time delay, $\alpha$ denotes an attenuation characteristic of the $i^{th}$ transmitter wired path, $\theta$ is a phase characteristic of the $i^{th}$ transmitter wired path, and $s_c(t)$ is the spread spectrum signal.

8. The method of claim 7, wherein a decimation having minimum fluctuation is detected from the extracted attenuation and phase characteristics of the $i^{th}$ transmitter wired path, data from the detected decimation is used as data for detecting path characteristics of the transmitter.

9. The method of claim 8, when the extracted attenuation and phase characteristics of the $i^{th}$ transmitter wired path include the fluctuation, a linear average of the attenuation characteristic is obtained by setting up a time window using equation:

$$\begin{cases} \alpha = \text{average}(\alpha(nT_c)), \quad \theta = \begin{cases} \theta_{max}, & \text{if } n1 > n2 \\ \theta_{min}, & \text{if } n1 > n2 \end{cases} \\ \text{where,} \\ n1 = \text{number}[\theta(nT_c) \geq (\theta_{max} - \theta_{tolerance})] \\ n2 = \text{number}[\theta(nT_c) \geq (\theta_{min} + \theta_{tolerance})] \\ \theta_{max} = \max[\theta(nTc), \theta_{min} = \min[\theta(nT_c)] \end{cases}$$

for $T_{window}$(time window)

where samples in a range from a maximum phase value ($\theta_{max}$) among the detected phases to a predetermined reference ($\theta_{telerance}$) value and samples in a range from a minimum phase value ($\theta_{min}$) to the predetermined reference value ($\theta_{telerance}$) are counted, the phase characteristics in the range having more samples are decided as phase characteristics.

10. The method of claim 7, wherein predetermined attenuation and phase characteristics of the i$^{th}$ cable are eliminated from the attenuation and phase characteristics of the i$^{th}$ transmitter wired path, and a path characteristic deviation of the transmitter is obtained by comparing attenuation and phase characteristics between the reception antenna and the i$^{th}$ transmission antenna.

* * * * *